INVENTOR.
JOHN J. QUACKENBUSH

3,472,201
CENTRIFUGAL COATING APPARATUS FOR COATING INTERIOR SURFACES OF BODIES

John J. Quackenbush, Monroe, Conn., assignor to National Distillers and Chemical Corporation, New York, N.Y., a corporation of Virginia
Filed May 25, 1967, Ser. No. 641,196
Int. Cl. B05b 7/00, 13/06; B05c 5/00
U.S. Cl. 118—308   1 Claim

ABSTRACT OF THE DISCLOSURE

Apparatus for coating the interior of a hollow body with dry plastic powder in which a rotating spindle having an annular discharge orifice enters the hollow body and rotates with respect thereto to discharge powdered thermoplastic materials onto the heated interior surface of the body to be coated. The body to be coated is caused to have relative axial motion with respect to the rotating spindle so that the entire axial length of the hollow interior surface is exposed to the centrifugal discharge of powder from the annular discharge orifice of the rotating spindle.

---

This invention relates to centrifugal coating apparatus, and more specifically relates to a novel rotating spindle having an annular discharge orifice which centrifugally casts out dry plastic powder toward the interior surfaces of a hollow body which is to be coated with plastic. The body is heated so that the powders coalesce as they strike the interior surface while the hollow body and the spindle are moved with respect to one another in an axial direction so that a complete surface coating is obtained.

The object to be coated may initially be preheated and subsequently internally coated, and thereafter exposed to higher temperatures in an oven to cause complete melting or fusing of the plastic powders to the interior surface of the body. By using a revolving hollow spindle in accordance with the invention, the amount of powder which is used can be efficiently metered and by providing some suitable air flow for carrying the powders, the exit speed of the particles, as the spindle is rotated, can be accurately controlled. If desired, the medium for carrying the plastic particles could be a liquid rather than a gas, while the orifice shape is suitably controlled to reduce turbulence in the discharge pattern to improve the coating operation.

Accordingly, a primary object of this invention is to provide a novel coating apparatus for applying a coating of thermoplastic powders to the interior of a hollow body.

Another object of this invention is to provide a novel apparatus for imparting centrifugal force to plastic particles to cause them to move toward the interior surfaces of an article to be coated.

Yet another object of this invention is to provide a novel apparatus for coating articles with plastic powders which permits an efficient metering of the plastic powder to be used.

These and other objects of this invention will become apparent from the following description when taken in connection with the drawings in which.

Figure 1:
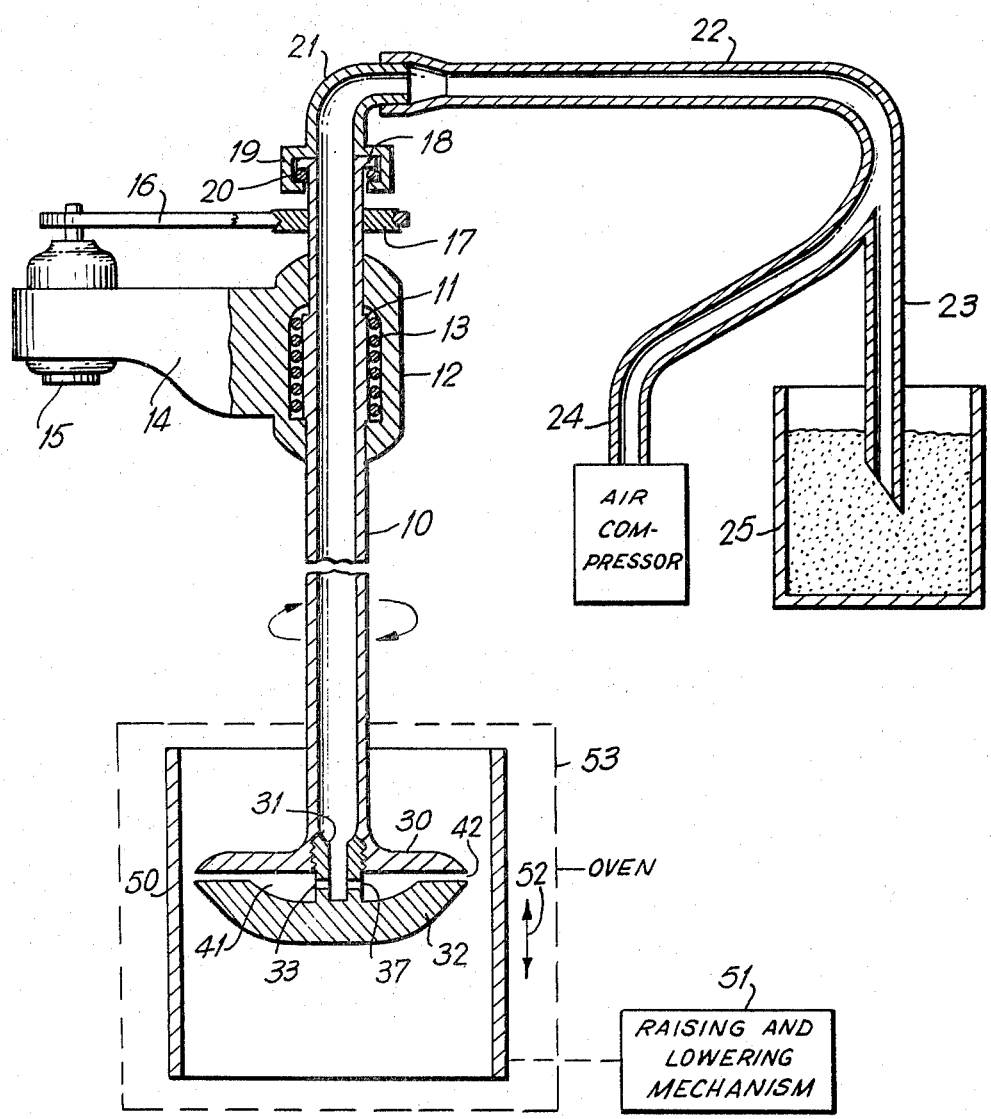
FIGURE 1 is a cross-sectional diagram of the novel apparatus of the present invention partially schematically illustrated.

Referring now to the drawings, there is illustrated an elongated hollow spindle 10 having an enlarged diameter portion 11 which is captured in a bearing support 12 which contains a suitable roller bearing 13, whereby spindle 10 is rotatable with respect to support 12. The support 12 has an extending region 14 which carries a drive motor 15 for driving belt 16 which is connected to pulley 17 which is suitably fastened to the upper extending portion of spindle 10. Thus, by suitably energizing motor 15, the motor will rotate spindle 10 with respect to main support 12. The upper end of spindle 10 has an outwardly flared end 18 that is connected to cup 19 through a suitable bearing means such as bearings 20 with suitable sealing means being provided to define a rotating joint between spindle 10 and the elbow member 21 which carries cup 19. A hose 22 is then suitably connected to elbow 21 and has two end portions 23 and 24. The end portion 23 is disposed in a hopper 25 which is filled with plastic powder while the portion 24 is connected to a suitable air compressor 26 which is adapted to force air through hose 22, and down through the center of spindle 10. This will create a negative pressure is member 23, thereby to force some predetermined amount of powder from hopper 25 to flow upwardly in hose 23 through hose 22, and downwardly into spindle 10.

The lower end of spindle 10 is formed into a circular upper orifice plate 30 which threadably receives an extending hub 31 of the lower circular orifice plate 32. The bottom of hub 31 is provided with suitable openings, such as openings 33 to 40, shown in FIGURE 2, with openings 33 and 37, seen in FIGURE 1. The openings 33 to 40 permit communication from the interior of spindle 10 to the annular chamber 41 having a circular discharge outlet 42.

The spindle 10 and discharge orifice 42 are then arranged to be placed in the interior of a hollow body which is to be coated on its interior, such as the hollow cylinder 50. Hollow cylinder 50 is then suitably connected to any desired type of mechanism, schematically shown as block 51, which will cause the cylinder 50 to move upwardly and downwardly, as illustrated by arrow 52 so that the discharge orifice 42 will be brought adjacent all axial portions of the cylinder 50.

Figure 2:
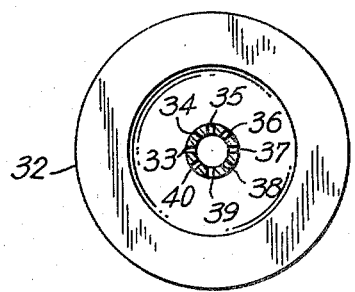
FIGURE 2 is a cross-sectional view taken through the threaded neck of the lower orifice plate of FIGURE 1 to illustrate the orifices therein which communicate with the circular discharge orifice.

The operation of the apparatus shown in FIGURES 1 and 2 is as follows:

The hopper 25 is loaded with plastic powder, such as polyethylene powders having some particular micron diameter. For example, type FN500 Microthene, available from U.S. Industrial Chemicals Company, which are powders having a 10 to 15 micron average diameter, could be loaded into hopper 25. The motor 15 is energized, thus causing spindle 10 to rotate at a speed sufficiently high to cause particles of this size to be ejected outwardly through orifice 42 to impinge upon the interior surface of cylinder 50. Air compressor 26 is turned on, and the pressure thereof is suitably controlled so that the particle density flowing through spindle 10 reaches the desired value necessary for the particular coating operation which is desired. Clearly, these parameters are selected for the particular coating application to which the machinery is adapted, and these ranges are not critical. In addition, the cylinder may be somewhat preheated so that plastic powder striking the interior of the cylinder will tend to stick to the wall and to one another without completely melting. The air carried powders are then carried down to the interior spindle 10 and through orifices 33 to 40 where, due to air pressure and centrifugal force, the particles are ejected toward the interior wall of cylinder 50.

When the operation is initiated, the cylinder 50 may be in its lowermost position with the top of the cylinder adjacent discharge orifice 42. Mechanism 51 then causes cylinder 50 to raise slowly so that the continued rotation of spindle 10 and discharge orifice 42 cause a continuous coating of plastic along the entire interior surface of cylinder 50.

Thereafter, the cylinder 50 may be removed and placed in a suitable oven, schematically illustrated in dotted lines in FIGURE 1 as oven 53, which exposes the particles which cling to the interior surface of cylinder 50 to sufficient temperatures to melt the coating and squarely fuse it to the cylinder surface.

The apparatus of the drawings will inherently efficiently meter the amount of powder being used by adjustment of the pressure of compressor 26 and by adjustment of the discharge orifice gap 42. Note that this gap can be adjusted as by threading the lower orifice plate 32 more or less with respect to the upper orifice 30. Any suitable locking structure for locking the plates 30 and 32 in position after adjustment has been made, can be incorporated into the apparatus. This is not illustrated herein since such an arrangement would be apparent to those skilled in the art.

It should further be noted that the entire rotating portion of the spindle structure is symmetric around its center of rotation and balanced to reduce vibration. Moreover, the discharge region or cavity 41 is streamlined to produce a minimum of turbulence and a minimum resistance to the outward flow of plastic particles due to rotation of spindle 10.

In FIGURES 1 and 2, the discharge orifice 42 is shown as a completely open discharge orifice. Clearly, however, other arrangements could be used such as equally spaced slots, or the like, to obtain the same coating results.

The embodiments of the invention in which an exclusive privilege or property is claimed are defined as follows:

1. A centrifugal coating apparatus comprising an elongated hollow spindle having an inlet end and an outlet end and rotatably connected to support means, motor means connected to said spindle for rotating said spindle about its longitudinal axis, a source of pressurized gas, a powder particle container, first conduit means connecting said source of pressurized gas to the inlet end of said spindle, second conduit means connecting said first conduit means to the interior of said container, whereby gas flow from said source of gas to said spindle means creates a negative pressure in said second conduit means for sweeping powdered particles from said container into said gas flow, and an adjustable size radial discharge orifice connected to the outlet end of said spindle and disposed substantially perpendicular to the longitudinal axis of said spindle for discharging powder particles carried by said gas flow into said spindle radially outward from said outlet end under the influence of the rotational force of said spindle, said discharge orifice comprising first and second opposing plates axially spaced from one another and disposed perpendicular to the longitudinal axis of said spindle and having their opposing surfaces forming a streamline annular cavity leading radially to a narrow circular discharge slit, said first plate being secured to the outlet end of said spindle and said second plate being axially adjustably connected to said first plate.

References Cited

UNITED STATES PATENTS

| | | | |
|---|---|---|---|
| 3,291,630 | 12/1966 | Deyle et al. | |
| 3,291,631 | 12/1966 | Smith | 118—308 X |
| 2,047,699 | 7/1936 | MacLachlan | 239—223 X |
| 2,336,946 | 12/1943 | Marden et al. | 118—308 X |
| 2,859,728 | 11/1958 | Hobdy | 118—306 |
| 2,892,444 | 6/1959 | Perkins | 118—306 |

FOREIGN PATENTS 145,108　4/1962　U.S.S.R.

WALTER A. SCHEEL, Primary Examiner
JOHN P. McINTOSH, Assistant Examiner

U.S. Cl. X.R.
118—317